(12) United States Patent
Burstyn

(10) Patent No.: US 6,406,150 B1
(45) Date of Patent: Jun. 18, 2002

(54) COMPACT REAR PROJECTIONS SYSTEM

(75) Inventor: Herschel Clement Burstyn, Lawrenceville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/611,706

(22) Filed: Jul. 7, 2000

Related U.S. Application Data

(60) Provisional application No. 60/143,058, filed on Jul. 9, 1999.

(51) Int. Cl.[7] .............................................. G03B 21/28
(52) U.S. Cl. ............................. 353/69; 353/98; 353/122
(58) Field of Search ............................. 353/69, 70, 74, 353/119, 122; 385/116, 119, 121; 348/745, 746, 747, 804

(56) References Cited

U.S. PATENT DOCUMENTS

| | | | |
|---|---|---|---|
| 3,975,095 A | 8/1976 | Minoura et al. ............... 353/69 |
| 4,944,656 A | 7/1990 | Feng et al. | |
| 4,969,732 A | 11/1990 | Wright et al. | |
| 5,019,807 A | 5/1991 | Stapleton et al. | |
| 5,179,440 A | 1/1993 | Loban et al. | |
| 5,274,406 A | 12/1993 | Tejima et al. ................. 353/70 |
| 5,333,072 A | 7/1994 | Willet | |
| 5,381,502 A | * | 1/1995 | Veldigan ...................... 385/115 |
| 5,422,691 A | * | 6/1995 | Ninomiya et al. ............. 353/69 |
| 5,455,882 A | * | 10/1995 | Veldigan ...................... 385/116 |
| 5,499,067 A | * | 3/1996 | Shibazaki ..................... 353/99 |
| 5,521,658 A | | 5/1996 | Donohoe ...................... 353/98 |
| 5,573,324 A | | 11/1996 | De Vaan | |
| 5,613,748 A | | 3/1997 | Yoshida et al. | |
| 5,639,151 A | | 6/1997 | McNelley et al. | |
| 5,741,057 A | | 4/1998 | Goldberg et al. | |
| 5,975,703 A | | 11/1999 | Holman et al. | |
| 6,002,826 A | * | 12/1999 | Veldigan ...................... 385/120 |
| 6,012,816 A | * | 1/2000 | Beiser ......................... 353/122 |
| 6,023,369 A | | 2/2000 | Goto | |
| 6,046,847 A | | 4/2000 | Takahashi | |
| 6,052,226 A | | 4/2000 | Takahashi | |
| 6,061,178 A | | 5/2000 | Park | |
| 6,222,971 B1 | * | 4/2001 | Veldigan et al. ............. 385/120 |

\* cited by examiner

*Primary Examiner*—William Dowling
(74) *Attorney, Agent, or Firm*—William J. Burke

(57) ABSTRACT

A rear projection imaging system includes a light collimator, a curved turning mirror and a projector source. The projector source is operable to anamorphically project an image along a projection path that includes optics, such as a cylindrical lens. The optics imposes a first Scheimpflug condition on the system. The projection path proceeds onto the light collimator, but first reflects from the curved turning mirror. The curved turning mirror imposes a second Scheimpflug condition on the system.

28 Claims, 2 Drawing Sheets

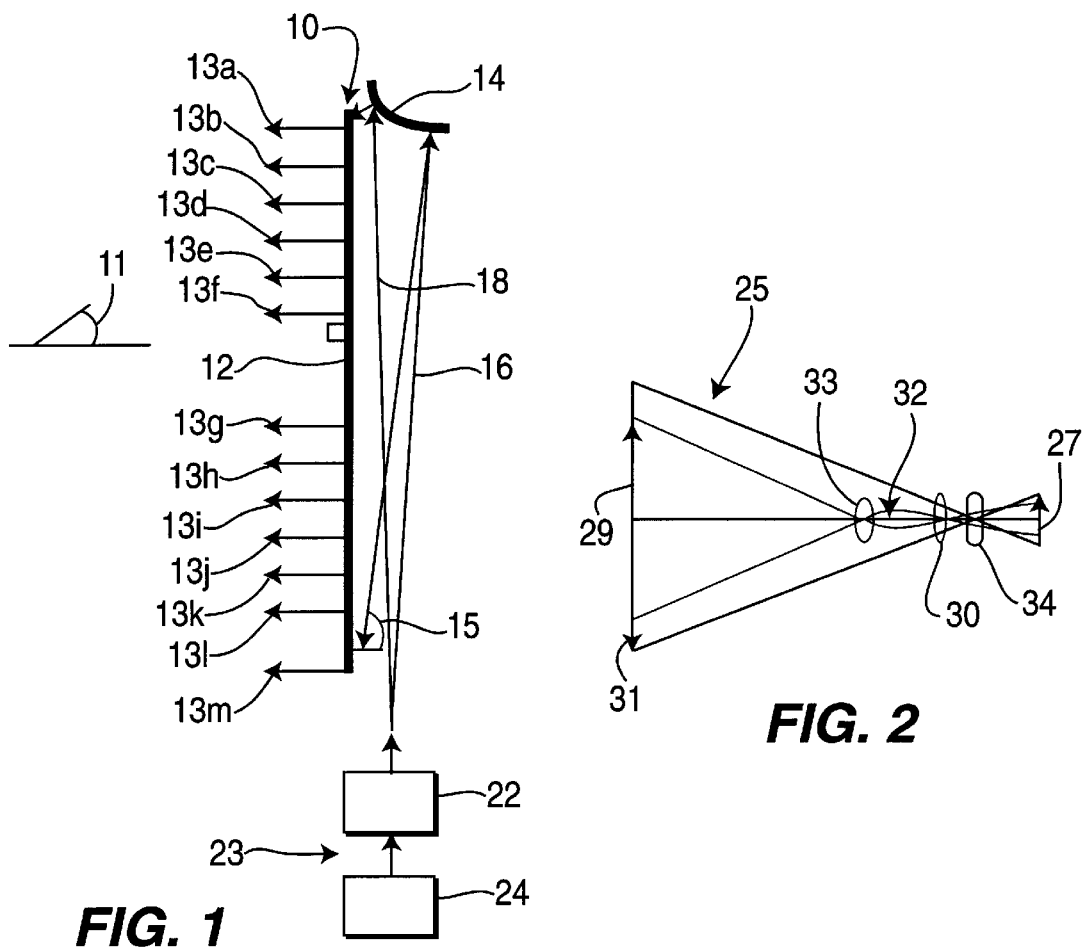
FIG. 1
FIG. 2
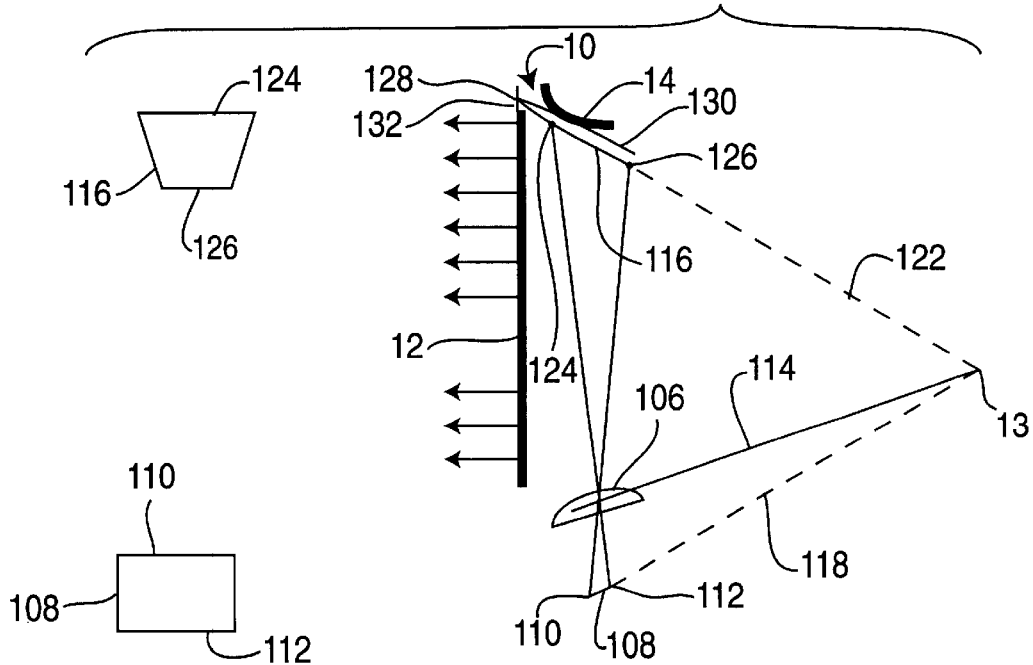
FIG. 3

COMPACT REAR PROJECTIONS SYSTEM

RELATED APPLICATION

This application claims priority from U.S. Provisional Patent Application No. 60/143,058, entitled "Compact Rear Projection System Based upon a Curved Turning Mirror and Anamorphic Projection" filed Jul. 9, 1999, which is incorporated herein by reference.

FIELD OF THE INVENTION

This invention relates to rear projection systems, and more particularly to rear projection systems that fold optics to reduce the cabinet depth of the system.

BACKGROUND OF THE INVENTION

Rear projection imaging systems typically include an image generation source, optics to enlarge and direct the image and a transmission screen for displaying the enlarged image. The image source can be of many different types, including cathode-ray tubes and LCD projectors. In simple systems, the optics generally includes a lens, such as a combined convex glass lens element and a methacrylic resin lens element, and a turning mirror for directing the image toward the screen. The transmission screens of typical systems generally include diffusing material, lenticular lens sheets and Fresnel lens sheets, which are intended to project a wide image with uniform brightness.

In operation, the image source is positioned behind the transmission screen and provides a small, bright image to the projecting lens. The projecting lens enlarges the image and directs it to the reflective surface of the turning mirror. The turning mirror reflects the image to the transmission screen. The lens sheets in the transmission screen further enlarge the image and collimate the projected light. The audience views the projected image from the transmission screen.

The depth dimension of known rear projection systems is constrained by the angle of incidence on and within the transmission screen's Fresnel lens. To make a compact rear projection package, a short focal length lens is required. A decreasing focal length increases the field of view as measured at the screen. As the field of view increases, the angles of incidence in air and within the Fresnel lens eventually approach the critical angle, causing transmission to drop to zero.

Even before the angle of incidence reaches the critical angle, the angle of incidence exceeds the Brewster angle. Exceeding the Brewster angle can cause the S (perpendicular) and P (parallel) polarization transmission coefficients to diverge, differing by as much as 50%. A divergence in polarization transmission coefficients results in image distortions, such as non-uniformity in brightness across the screen.

SUMMARY OF THE INVENTION

A projection system according to the principles of the invention achieves a reduction in the depth dimension without sacrificing image sharpness or brightness uniformity across the screen. In one aspect of the invention, a rear projection imaging system includes a projector source operable to anamorphically project an image. Anamorphic projection outputs different magnifications along mutually perpendicular radii. The image is projected along a projection path onto a non-planar (curved in a side view) turning mirror. The curved turning mirror directs the projected image to a light collimator, such as a transmission screen. The transmission screen can include a Fresnel lens. The curved turning mirror permits for a decreased cabinet depth; it folds the optical in less space than a planar mirror. Distortions introduced by the non-planar turning mirror correct the anamorphicallly projected image. The anamorphic projection optics and the curved turning mirror both impose respective Scheimpflug conditions on the image, resulting in a sharp image in the image plane.

BRIEF DESCRIPTION OF THE DRAWINGS

The teachings of the present invention can be readily understood by considering the following detailed description in conjunction with the accompanying drawings, in which:

FIG. 1 shows a side view of a first embodiment of the invention;

FIG. 2 illustrates the horizontal and vertical optics in an anamorphic projection scheme;

FIG. 3 shows, in a side view of the first embodiment, trapezoidal distortion and imposition of Scheimpflug conditions;

DETAILED DESCRIPTION

Figure 6:
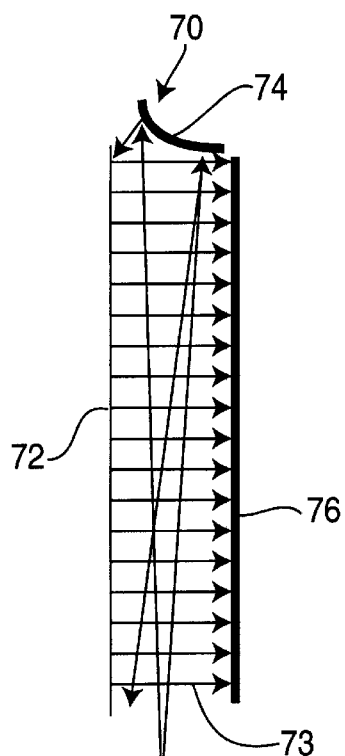
FIG. 6 shows a profile of a Fresnel meniscus lens.
Figure 6:
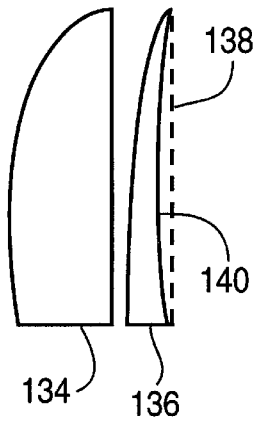

FIG. 1 illustrates a rear projection imaging system 10 according to the principles of the invention. The rear projection imaging system 10 includes a projector 24, anamorphic optics 22, a curved turning mirror 14 and a collimator 12. The projector 24 may be a projector used, for example, in a rear projection television set. As a further example, the projector 24 may be an LCD or other light valve that switches optical signals to corresponding pixels on a display screen. For clarity of presentation, FIG. 1 shows a first projection path 16 and a second projection path 18. The first projection path 16 includes light rays 13(m) that carry the projected image. The projected image emanates from the projector 24 and is received by the anamorphic optics 22. Anamorphic optics output different optical magnifications along mutually perpendicular radii. The anamorphic optics 22 of FIG. 1 includes one or more lenses, mirrors or other optical manipulating, magnifying or correcting devices. The anamorphic optics 22 and the projector 24 together operate as a projector source 23 to anamorphically project an image.

The first projection path 16 proceeds from the anamorphic optics 22 to a curved turning mirror 14. The turning or folding mirror is a mirror that is used to alter the path of an incident beam. A turning mirror 14 according to the principles of the invention is non-planar, or curved when viewed from the side. The curved mirror 14 requires less cabinet depth than a planar mirror providing analogous folding functionality. As FIG. 1 shows, rays projected along the first projection path 16 are reflected by the turning mirror 14 toward the lower part of the incident surface 17 of the light collimator 12. Rays along the second projection path 18 reflect from the turning mirror 14 to an upper portion of the incident surface 17 of the collimator 12. These paths 16 and 18 are deflected at the collimator 12 and output in parallel rays 13($a$–$m$). The illustrated projection paths 16 and 18 are two examples of the plurality of projection paths that yield rays such as rays 13($a$)–13($m$). A collimator, such as the collimator 12 shown in FIG. 1, is a device that receives light and, in response, outputs parallel rays of light. The collimator 12 in the system of FIG. 1 can include Fresnel lenses, which are thin optical lenses that consist of concentric rings of segmental lenses. The rays project out from the collimator 12 and are seen by a viewer whose eyes focus them to form a viewed image.

As shown on the ray trace for the system 10 of FIG. 1, rays on the second projection path 18 are incident on the surface 17 at a relatively low angle of incidence 11 (the angle between the incident rays and the normal to the incident surface). In comparison, the rays along the first path 16 have a higher angle of incidence 15. Transmission degrades when the angle of incidence exceeds the Brewster angle. Assuming a plastic Fresnel lens, the Brewster angle is about 56 degrees in air. In practice, a Fresnel lens will normally not function as desired if the incidence angle in air exceeds 45 degrees.

To accommodate higher incidence angles, the collimator 12 can be constructed differently in the lower portion than in the upper portion. In the system shown in FIG. 1, the lower portion can include total image reflection (TIR) Fresnel elements. TIR occurs when substantially all the incident rays are reflected. The TIR elements can include prisms that totally reflect the light; yet, the element is configured to collimate incoming light as shown in FIG. 1 and described above. A light collimator that acts as a projection screen and includes TIR Fresnel elements is called a TIR Fresnel screen.

FIG. 2 shows an anamorphic projection scheme 25 that can be used in the system shown in FIG. 1. In this scheme 25, the horizontal and vertical magnifications are handled by separate optics. The vertical optics includes a first cylindrical lens 30 and a second cylindrical lens 33. The second cylindrical lens 33 corresponds to the turning mirror 14 of the system 10 shown in FIG. 1. A lens is used here for ease of explanation. Both cylindrical lenses 30 and 33 magnify in the horizontal direction. The first cylindrical lens 30 outputs an inverted intermediate image 32 at a magnification of $-m_i$. The negative sign indicates inversion. The second cylindrical lens 33 magnifies the intermediate image 32 at a magnification of $-m_v$ and again inverts the image. The resulting non-inverted image 29 has a composite magnification of $(-m_i)*(-m_v)=m_h$.

For the horizontal optics, the cylindrical lens 34 magnifies at, for example, a magnification of $-m_h$, to produce an inverted image 31. The horizontal image can be inverted again prior to viewing. For example, the overall magnification of the horizontal optics can be changed from $-m_h$ to $m_h$ (inverting the inverted image) by an LCD panel incorporated into the collimator 12, or by light valves incorporated into projector source 23. Although known LCD and rear projection systems assume that overall vertical and horizontal magnifications will be equal, different vertical and horizontal magnifications can be used in the anamorphic optics without departing from the principles of the invention.

The two-stage magnification in the horizontal optics implements two corresponding Scheimpflug stages. An optical arrangement known as the Scheimpflug condition orients the object plane, image plane and the principal plane of a cylindrical lens so that the three planes intersect at a single line. The Scheimpflug condition is then said to be imposed by the optics, such as a cylindrical lens. The intent of imposing Scheimpflug behavior is to obtain a sharp image in the image plane. A resulting artifact is trapezoidal distortion or "keystoning" of the image. In the system 10 of FIG. 1, the first Scheimpflug stage trapezoidally distorts a rectangular image. The second stage performs a complementary process so as to correct a trapezoidal image back into a rectangular image. This rectifies the keystoning effect created by the first stage. In the system 10 of FIG. 1, the anamorphic optics 22 imposes the first Scheimpflug condition and the turning mirror 14 imposes the second.

FIG. 3 illustrates the Scheimpflug behavior of the folded system of FIG. 1. Reference numbers 10, 12 and 14 correspond to the same reference numbers in FIG. 1. The cylindrical lens 106 corresponds to the cylindrical lens 30 in FIG. 2. For simplicity of presentation, the cylindrical lens 34 is not shown in FIG. 3. The lens 106 magnifies a rectangular image 108 in a direction normal to the surface of the paper on which FIG. 3 appears. The resulting image 116 is projected toward the curved turning mirror 14, and reflected onto the screen 12. The mirror 14 serves as a replacement in fulfilling the function of the cylindrical lens 33 in FIG. 2. The cylindrical lens 106 has a principal plane 114 that intersects an object plane 118 at a line 120. A plane 122 of the image 116 also intersects line 120. As mentioned above, an optical arrangement known as the Scheimpflug condition orients the object plane, image plane and principal plane of a cylindrical lens so that the three planes intersect at a single line.

The effect of the Scheimpflug condition imposed by the cylindrical lens 106 is illustrated by the before 108 and after 116 images. The before image is shown as a rectangular image 108 with sides 110 and 112. The after image 116 is trapezoidal, with a side 124 larger than an opposite side 126. The cylindrical lens 106 creates the trapezoidal distortion in the rectangular image 108. The principal plane of lens 106 is shown to meet the object plane 118 at line 120, and, thus, lens 106 is tilted with respect to rectangular image 108. This tilting, together with the fact that lens 106 is de-centered, causes the trapezoidal distortion evident in image 116, as seen in FIG. 3. Image 116 results from the output of a first stage of distortion, and corresponds to the intermediate image 32 in FIG. 2.

A second, complementary stage of distortion occurs in accordance with the second Scheimpflug condition. As illustrated in FIG. 3, a plane 122 and a plane 130 of the curved turning mirror 14 intersect at a line 128. The image plane 132 also intersects line 128. Therefore, the mirror 14 imposes a second Scheimpflug condition. The second condition is complementary to the first, so as to distort the trapezoidal image back to rectangular form on the incident surface 17 of collimator 12 in FIG. 1.

Referring again to the system shown in FIG. 1, the projector 24 projects an image along projection path 16 through the anamorphic optics 22. Path 16 reflects from curved turning mirror 14 and arrives at collimating surface 12. Because the curved turning mirror 14 is both spaced away from screen 12 and appropriately tilted, it imposes both anamorphic and Scheimpflug behavior in rear projection imaging system 10. Screen 12, implemented as a TIR Fresnel screen, refracts the image received into collimated rays, such as rays 13a–13m, for viewing. A trapezoidally distorted image is projected along paths 16 and 18 toward curved turning mirror 14. As an alternative, the projector source 23 may be directed so that optics 22 is implemented with a turning mirror, which may be curved to serve the function of lenses.

In the system of FIG. 1, the cylindrical Fresnel lens at the screen can be replaced with a pair of tandem lenses. In effect, the power is split between the two lenses. As a result, the angle of incidence within the collimator medium is lessened for each of the tandem lenses of the pair. Limiting the angle of incidence within the medium becomes important as the critical angle is approached, and even before that point, when the Brewster angle is exceeded. Above the Brewster angle in plastic, about 33.5 degrees, the S and P polarization transmission coefficients can differ by about 50%, resulting in large non-uniformity in brightness at the screen. As the critical angle, about 42 degrees, is approached, transmission drops to zero. Splitting the power between the pair of tandem lenses allows the incidence angles in the medium to be lowered. This avoids or limits image degradation. The advantage of the anamorphic scheme is that it minimizes the ray fans. As a result, the split of optical powers can be divided into a "strong" lens and a "weak" one. With disparate curvatures, disparate pitches in the two sections of a compound Fresnel cylinder lens are implemented. This minimizes moire.

Figure 5:
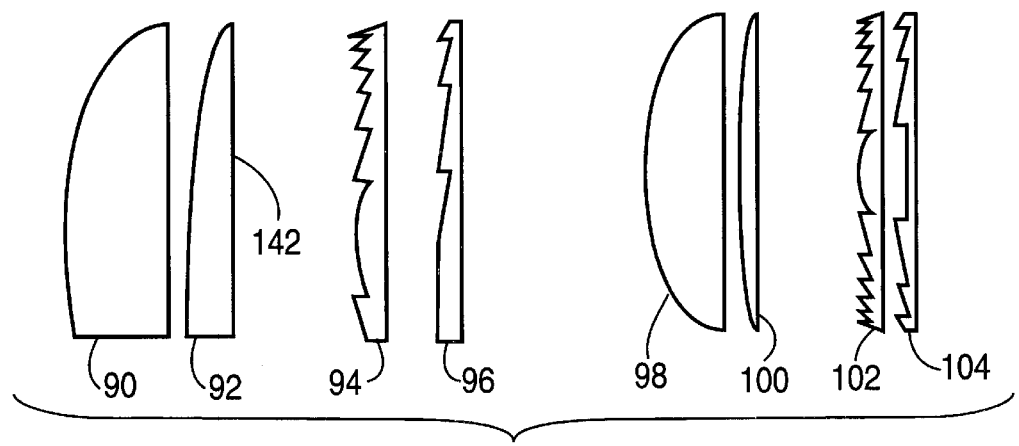
FIG. 5 shows profiles of tandem lens pairs implemented at a collimating surface.

FIG. 5 shows profiles of tandem pairs of cylindrical lenses that can be implemented at the screen 12 of FIG. 1. Profiles 90 and 92 represent, respectively, the primary and secondary vertical profiles of the lenses. Profiles 94 and 96 are the Fresnel equivalents. Similarly, profiles 98 and 100 are the primary and secondary horizontal profiles, and profiles 102 and 104 are the Fresnel equivalents. Referring to FIG. 1, rays in the projection paths 16 and 18 impinge on the secondary lens and are refracted into the primary lens.

As the field angles become even larger, the Brewster angle in air is approached. This means that, for extremely compact rear-screen projectors, the leading surface, i.e., the one facing the incoming projection beam, needs to be curved. A plano surface is made concave to implement a Fresnel lens with a very low spatial period for the pitch. The result is a Fresnel meniscus lens. Such a lens with a concave surface 140 is shown in FIG. 6. A dotted line 138 corresponding to a surface 142 of the profile 92 in FIG. 5 is shown for comparison purposes. Thus, the rear projection imaging system can be made even more compact.

Figure 4:
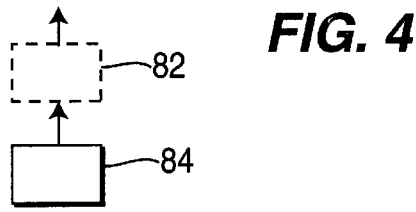
FIG. 4 shows a side view of a second embodiment of the invention.

FIG. 4 illustrates another rear projection imaging system 70 according to the principles of the invention. The rear projection imaging system 70 of FIG. 4 includes a projector 84 which projects an image through the anamorphic optics 82. The output of the anamorphic optics 82 is directed to a turning mirror 74. Instead of directing the image to a screen, the turning mirror 74 directs the image to a collimator 72 implemented as a reflective Fresnel mirror (such as a metalized Fresnel mirror). Collimated rays 73 reflected from the collimator 72 are received at a conventional diffusive screen 76. The diffusive screen can include additional optical elements, such as lenticular lenses. The viewing audience views the projected image from the screen 76.

The examples given herein are presented to enable those skilled in the art to more clearly understand and practice the invention. The examples should not be considered as limitations upon the scope of the invention, but as merely illustrative. Numerous modifications and alternative embodiments of the invention will be apparent to those skilled in the art in view of the foregoing description.

What is claimed is:

1. A rear projection imaging system comprising:
a light collimator;
a curved turning mirror; and
a projector source operable to anamorphically project an image along a projection path onto the light collimator, the projection path reflecting from the curved turning mirror.

2. The rear projection imaging system of claim 1, wherein the light collimator comprises a TIR Fresnel screen.

3. The rear projection imaging system of claim 1, wherein the collimator comprises a reflective Fresnel mirror.

4. The rear projection imaging system of claim 1, wherein the curved turning mirror is a cylindrical mirror.

5. The rear projection imaging system of claim 1, wherein the curved turning mirror imposes Scheimpflug behavior on the projected image.

6. The rear projection imaging system of claim 5, wherein the projection path encounters anamorphic optics before arriving at the curved turning mirror.

7. The rear projection imaging system of claim 6, wherein the anamorphic optics is configured subject to a first Scheimpflug condition.

8. The rear projection imaging system of claim 7, wherein the anamorphic optics comprises an anamorphic lens.

9. The rear projection imaging system of claim 1, wherein the collimator has a surface for receiving the projection path and the curved turning mirror is both spaced apart from the surface and tilted with respect to the surface.

10. The rear projection imaging system of claim 1 wherein the image is a trapezoidally distorted image.

11. The rear projection imaging system of claim 1, wherein the projection path passes through an anamorphic lens prior to arriving at the curved turning mirror.

12. The rear projection imaging system of claim 11, wherein the anamorphic lens is a cylindrical lens.

13. The rear projection imaging system of claim 1, wherein the projector source projects along the projection path an anamorphically corrected image toward the curved turning mirror.

14. The rear projection imaging system of claim 1, wherein the projection path is reflected subsequent to leaving the projecting source and prior to arriving at the curved turning mirror.

15. The rear projection imaging system of claim 14, wherein the reflection prior to arriving at the curved turning mirror occurs at a second curved turning mirror.

16. The rear projection imaging system of claim 15 wherein the second curved turning mirror is a cylindrical mirror.

17. The rear projection imaging system of claim 1, wherein the image is received by the collimator directly from the curved turning mirror.

18. The rear projection imaging system of claim 1, wherein the image is projected via rays, and the collimator has a surface, and at least some of the rays strike the surface at an angle of incidence that exceeds 45 degrees.

19. A method of rear projection of an image, the method comprising the steps of:
providing a light collimator;
providing a curved turning mirror; and
anamorphically projecting an image along a projection path onto the light collimator, the projection path reflecting from the curved turning mirror.

20. The method of claim 19, wherein the light collimator comprises a TIR Fresnel screen.

21. The method of claim 19, wherein the light collimator comprises a reflective Fresnel mirror.

22. The method of claim 19, wherein the curved turning mirror imposes Scheimpflug behavior on the projected image.

23. The method of claim 22, wherein the projection path encounters anamorphic optics before arriving at the curved turning mirror.

24. The method of claim 23, wherein the anamorphic optic s is configured subject to a first Scheimpflug condition and the Scheimpflug behavior is imposed by a second Scheimpflug condition.

25. The method of claim 24, wherein the anamorphic optics comprises an anamorphic lens.

26. The method of claim 19, where the projection path passes through a cylindrical lens prior to arriving at the curved turning mirror.

27. The method of claim 19, wherein the projection path is reflected subsequent to leaving the projecting source and prior to arriving at the curved turning mirror.

28. A rear projection system comprising:

a projector source operable to anamorphically project an image;

an optical device responsive to the anamorphically projected image and operable to correct the anamorphically projected image; and a screen responsive to the corrected image, wherein the image traverses a folded optical path.

* * * * *